United States Patent [19]

Baker

[11] Patent Number: 4,521,707

[45] Date of Patent: Jun. 4, 1985

[54] TRIPLE REDUNDANT ELECTROMECHANICAL LINEAR ACTUATOR AND METHOD

[75] Inventor: Irwin G. Baker, Bellevue, Wash.

[73] Assignee: The Boeing Company, Seattle, Wash.

[21] Appl. No.: 560,971

[22] Filed: Dec. 12, 1983

[51] Int. Cl.³ .............................................. H02K 7/06
[52] U.S. Cl. ........................................ 310/80; 310/83; 310/112
[58] Field of Search .................. 310/14, 112, 83, 80, 310/75 D

[56] References Cited

U.S. PATENT DOCUMENTS

| | | | |
|---|---|---|---|
| 2,085,336 | 6/1937 | Sandstone | 310/75 D |
| 2,479,019 | 8/1949 | Ochtman | 310/83 X |
| 2,860,266 | 11/1958 | Schrader | 310/112 |
| 3,152,960 | 10/1964 | Alfred | 176/36 |
| 3,264,502 | 8/1966 | Lytle et al. | 310/49 |
| 3,309,588 | 3/1967 | Martin et al. | 318/19 |
| 3,402,308 | 9/1968 | Henschke | 310/80 |
| 3,407,680 | 10/1968 | Westmoreland | 310/112 X |
| 3,430,120 | 2/1969 | Kotaka et al. | 310/146 |
| 3,449,604 | 6/1969 | Wagner | 310/14 |
| 3,457,479 | 7/1969 | Varner | 318/18 |
| 3,498,569 | 3/1970 | Kjos | 310/112 X |
| 3,593,092 | 7/1971 | Flippo | 318/564 |
| 3,679,956 | 7/1972 | Redmond | 318/564 |
| 4,289,996 | 9/1981 | Barnes et al. | 318/38 |
| 4,398,109 | 8/1983 | Kuvako et al. | 310/80 |

Primary Examiner—Donovan F. Duggan
Attorney, Agent, or Firm—Joan H. Pauly

[57] ABSTRACT

Three motors (9, 13, 17) are operated independently to extend telescopically first, second, and third coaxial stages (30, 38, 52). Each motor (9, 13, 17) has an axial extension (28, 36, 48) on its rotor (12, 16, 20) that threadedly engages the respective stage (30, 38, 52). Extension (28) is fixed to rotor (12). Extensions (36, 48) are spline connected to rotors (16, 20). First stage (30) is attached to extension (36) by a bearing (62). Second stage (38) is attached to extension (48) by a bearing (64). When first stage (30) extends or retracts, it carries with it second and third stages (38, 52) and extensions (36, 48). When second stage (38) extends or retracts, it carries with it third stage (52) and extension (48). Stages (30, 38, 52) are fixed against rotation relative to a housing (4).

16 Claims, 9 Drawing Figures

TRIPLE REDUNDANT ELECTROMECHANICAL LINEAR ACTUATOR AND METHOD

DESCRIPTION

1. Technical Field

This invention relates to methods and apparatus for linear actuation and, more particularly, to an electromechanical linear actuator that has concentric drives and spline connections to provide triple redundancy and mechanically summed displacement output in a minimum amount of space, and to a method of operating the same.

2. Background Art

In a modern aircraft there are a number of movable components, such as control surfaces for varying the aerodynamic characteristics of the aircraft, that require reliable linear actuators to be moved from one position to another. In conventional aircraft, the required linear actuation has generally been provided by hydraulic actuators. The hydraulic actuators currently in use have a number of serious disadvantages. The systems of conduits required to power these actuators are quite heavy and require a good deal of space. Both of these characteristics are serious disadvantages in the aircraft environment. In addition, the conduit systems are quite expensive and therefore add to the overall cost of the aircraft. These problems are all magnified when there is the need to provide triple redundant actuation, which is now required by the Federal Aviation Administration for at least some of the actuators in commercial aircraft. An additional problem associated with hydraulic actuators is that it is relatively difficult to achieve an accurate displacement by moving the actuator through only part of its stroke.

Each of the following United States patents discloses an electromechanical linear actuator:

U.S. Pat. No. 2,860,266, granted Nov. 11, 1958, to D. L. Schrader; No. 3,152,960, granted Oct. 13, 1964, to M. Alfred; No. 3,264,502, granted Aug. 2, 1966, to C. W. Lytle et al.; No. 3,309,588, granted Mar. 14, 1967, to D. J. Martin et al.; No. 3,402,308, granted Sept. 17, 1968, to W. O. Henschke; No. 3,407,680, granted Oct. 29, 1968, to J. C. Westmoreland; No. 3,457,479, granted July 22, 1969, to H. M. Varner; No. 3,593,092, granted July 13, 1971, to R. V. Flippo; No. 3,679,956, granted July 25, 1972, to W. G. Redmond; and No. 4,289,996, granted Sept. 15, 1981, to Barnes et al.

Lytle et al. U.S. Pat. No. 3,264,502 and Henschke U.S. Pat. No. 3,402,308 each disclose a device having a single motor that is operated to move a threaded rod axially. Schrader U.S. Pat. No. 2,860,266 and Westmoreland U.S. Pat. No. 3,407,680 each disclose a device in which two fixed motors are separately connected to a shaft. One motor is threadedly connected to the shaft, and the other motor is spline connected to the shaft. A differential in the speed of the two motors creates an axial displacement of the shaft.

Alfred U.S. Pat. No. 3,152,960 discloses a control device having two electric motors. The first motor turns a nut to axially displace the control rod of a nuclear reactor. The nut engages and axially displaces a threaded shaft mounted on one end of the control rod. The second motor rotates the threaded shaft by rotating a square cross section shaft that is received into a square axial hole in the threaded shaft. The rotation of the second motor also compresses a spring. Reversal of the second motor by the spring creates a reverse rotation of the threaded shaft to activate a release mechanism and expel the control rod.

Varner U.S. Pat. No. 3,457,479, Flippe U.S. Pat. No. 3,593,092, Redmond U.S. Pat. No. 3,679,956, and Barnes et al. U.S. Pat. No. 4,289,996 each disclose an actuator for use in aircraft or spacecraft that includes a plurality of motors. Each of the motors is fixed in position, and in each actuator there is a single output from the plurality of motors that is velocity summed or power summed. The Varner device includes a spline connection to prevent rotation of a nut that moves along a jack screw when the jack screw rotates.

Martin et al. U.S. Pat. No. 3,309,588 disclose an actuator having three motors connected in series. One of these motors is fixed, and the others move axially. The output of the three motors is displacement summed.

The above patents and the prior art that is discussed and/or cited therein should be studied for the purpose of putting the present invention into proper perspective relative to the prior art.

DISCLOSURE OF THE INVENTION

The subject of this invention is a linear actuator. According to an aspect of the invention, the actuator comprises a housing and a plurality of extendible/retractable coaxial stages positioned telescopically with respect to the housing and each other. The actuator also includes a like number of electric motors. Each of these motors has a stator portion that is attached to the housing, and a rotor portion. Drive transmission means interconnects each rotor portion and a different one of the stages for converting rotational motion of the rotor portion into linear axial motion of the stage.

According to another aspect of the invention, each drive transmission means comprises screw means. Preferably, each screw means comprises a threaded cylindrical surface on the interconnected stage and an axial extension carried by the interconnected rotor portion. The axial extension has a threaded cylindrical surface that threadedly engages said surface on the stage.

According to another aspect of the invention, each drive transmission means includes an axial extension carried by the interconnected rotor portion. This extension is interconnected with the corresponding stage. Preferably, at least one, but not all, of the axial extensions is mechanically connected to its rotor portion to prevent it from rotating relative to its rotor portion but permit it to translate axially relative to its rotor portion.

According to a preferred aspect of the invention, one of the axial extensions is fixed to its rotor portion to prevent it from either rotating or translating relative to its rotor portion. Each of the other axial extensions is mechanically connected to its rotor portion to prevent it from rotating relative to its rotor portion but permit it to translate axially relative to its rotor portion. Each of these other axial extensions is positioned in the same radial direction with respect to the fixed axial extension. All the stages are mechanically connected to the housing and each other to permit them to translate axially relative to the housing and each other but prevent them from rotating relative to the housing and each other. Preferably, each of said other axial extensions is spline connected to its rotor portion.

According to another preferred aspect of the invention, one of the pair including the housing and the stage interconnected with the fixed axial extension and one of each pair of radially adjacent stages has an axially extending slot, and the other of each of said pairs has a radial projection that projects into its paired slot.

According to still another preferred aspect of the invention, the actuator further comprises bearing means interconnecting each stage and the axial extension that is radially adjacent to and positioned in said same radial direction with respect to its interconnected axial extension. This permits rotation but prevents axial translation of the stage and said adjacent axial extension with respect to each other. Preferably, the stages and the axial extensions are dimensioned so that the maximum axial displacement of each stage resulting from rotation of its interconnecting axial extension is at least equal to a desired total axial displacement.

Actuators constructed according to the invention do not require any hydraulic conduit systems. Therefore, the problems discussed above in relation to such conduit systems are avoided. Instead of requiring a conduit system that is heavy, space consuming, and relatively expensive, an actuator constructed according to the invention requires only lightweight and relatively inexpensive wiring that takes up very little space. The telescopic arrangement of actuators of the invention allows the space requirements of the actuators themselves to be kept to a minimum.

In actuators constructed according to the preferred embodiment of the invention, the space requirements of the actuator itself are further minimized. The screw drives and spline connections of the preferred embodiment allow the very efficient use of space to provide linear actuation with any required degree of redundancy. In addition, the use of electric motors makes it possible to achieve an accurate partial displacement of any one or all of the stages. This capability allows the operation of the actuator to be varied to fit the needs of particular circumstances and greatly enhances the overall reliability of the actuator.

According to a method aspect of the invention, a method of providing redundant actuation of linear motion comprises positioning a plurality of stages in a concentric telescopic arrangement. Independent drive means is operated to axially displace each stage a given amount, and the displacements of the stages are mechanically summed to produce a desired total axial displacement. Each stage is dimensioned to make its maximum axial displacement by its drive means at least equal to this desired total axial displacement. In the event of a failure of some but not all of the drive means, the remaining drive means are operated to displace their stages additional amounts sufficient to provide the desired total axial displacement. Preferably, the method further comprises, after providing the desired total axial displacement, reversing any one of the drive means to displace its stage in the direction opposite to the desired total displacement to neutralize a system activated by such total displacement.

The method of the invention has the advantage of providing reliable redundant linear actuation. The total required displacement can be achieved in spite of failures in one or more of the drive means, as long as at least one drive means remains operational. In the preferred embodiment of the method of the invention, the system being activated may at least be neutralized after activation in spite of failures following activation, as long as at least one drive means remains operational.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figures 1, 7, 8:
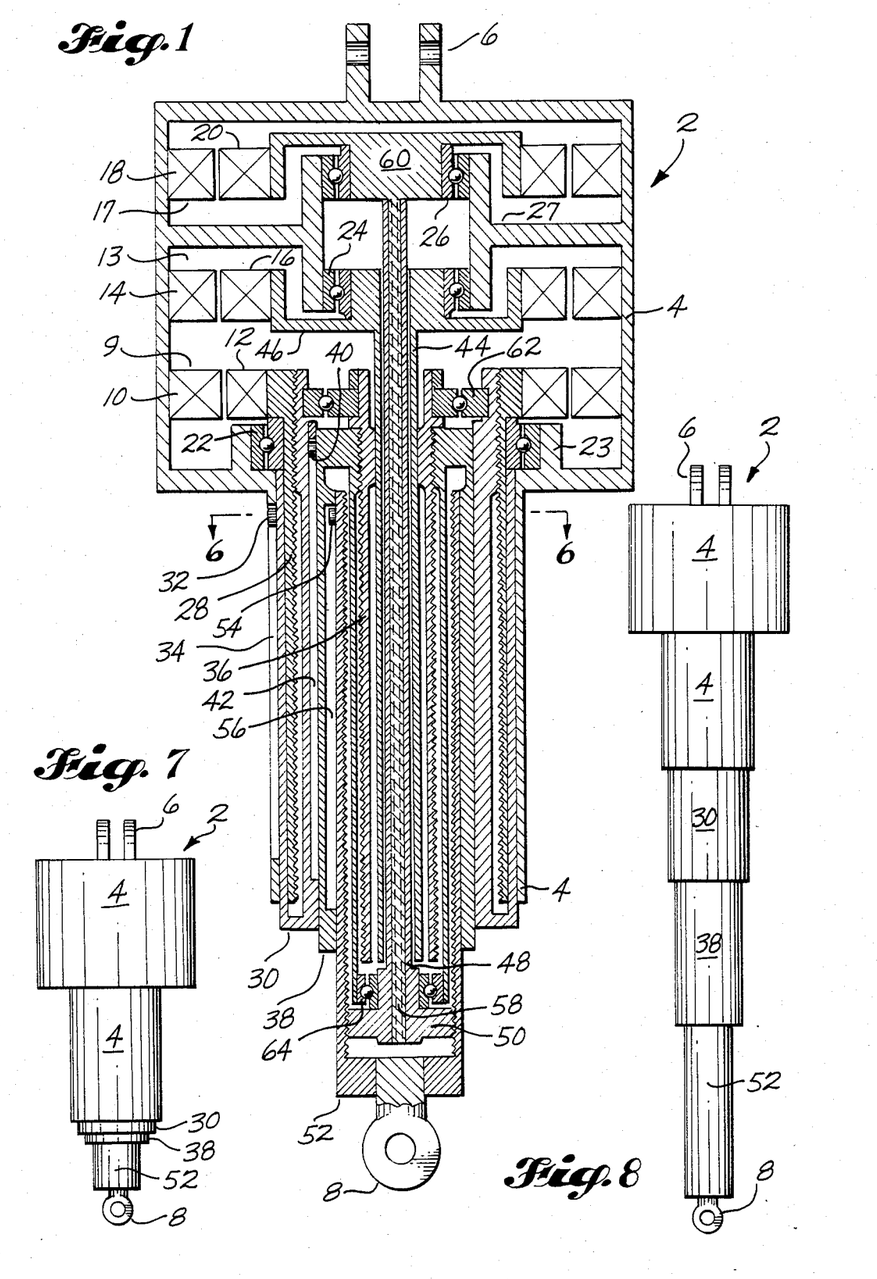
FIG. 1 is a sectional view of the preferred embodiment of the actuator, showing all three stages in their fully retracted positions.
FIG. 7 is an elevational view of the preferred embodiment of the actuator, showing all three stages in their fully retracted positions.
FIG. 8 is like FIG. 7 except that it shows all three stages in their fully extended positions.
Figure 2:
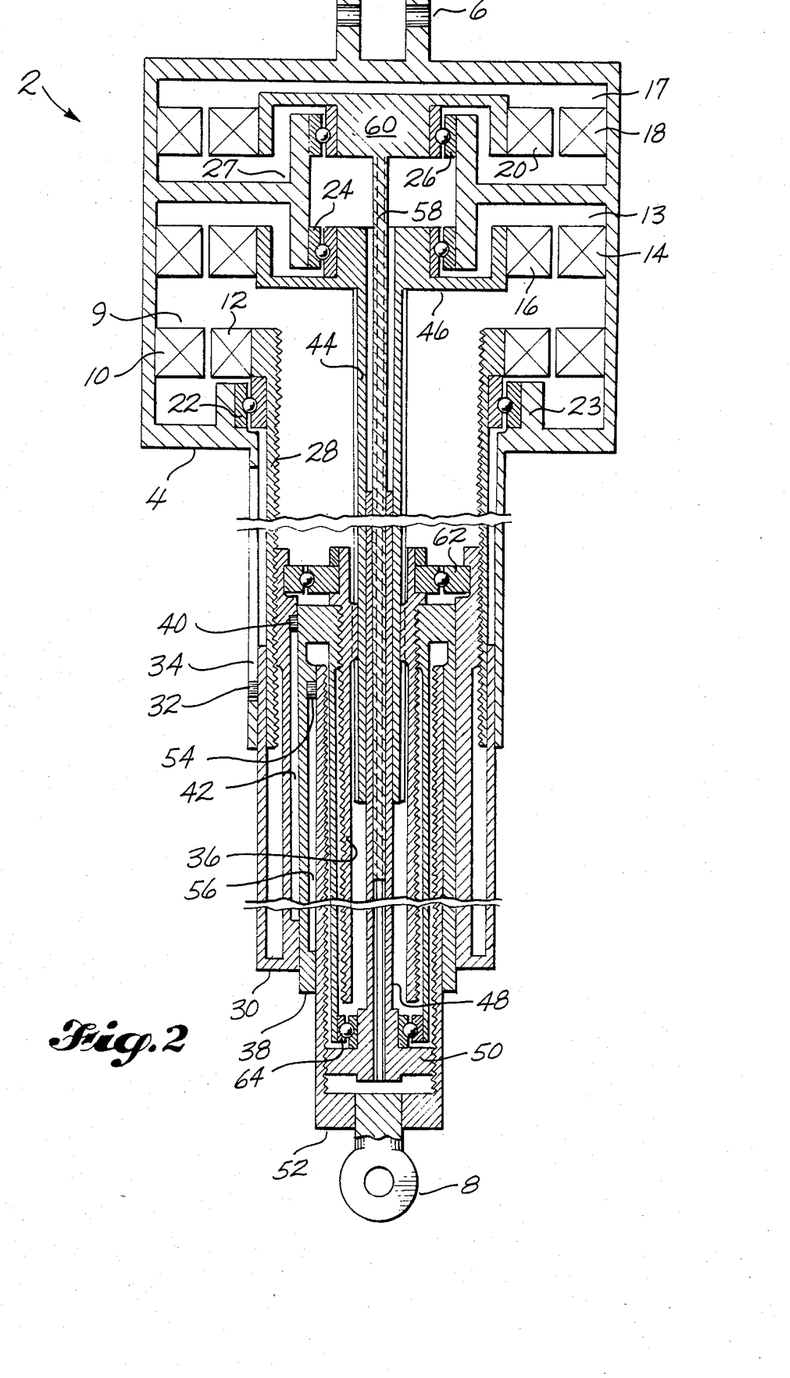
FIG. 2 is like FIG. 1 except that the first stage is shown in its fully extended position and portions of the actuator have been omitted to reduce the size of the figure.
Figure 3:
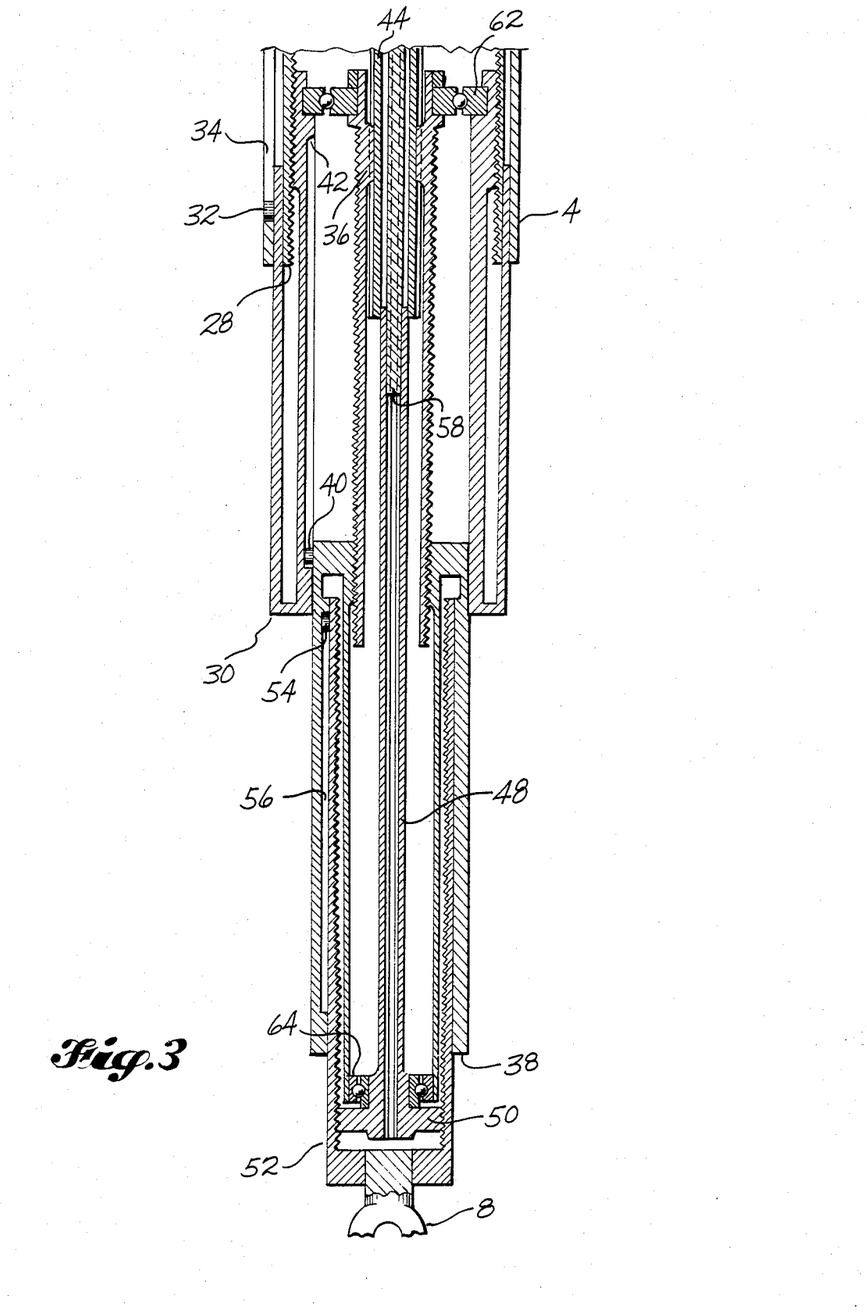
FIG. 3 is a sectional view of a portion of the preferred embodiment of the actuator, showing the first and second stages in their fully extended positions and the third stage in its fully retracted position.
Figure 4:
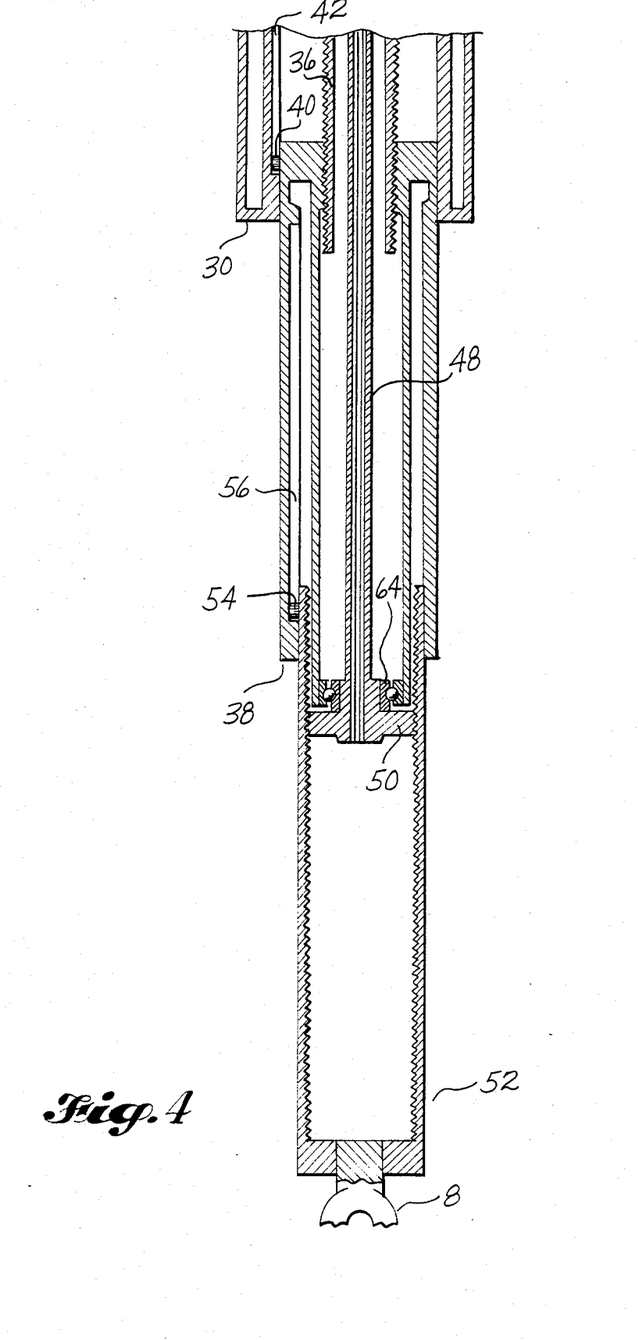
FIG. 4 is like FIG. 3 except that it shows all three stages in their fully extended positions.
Figure 5:
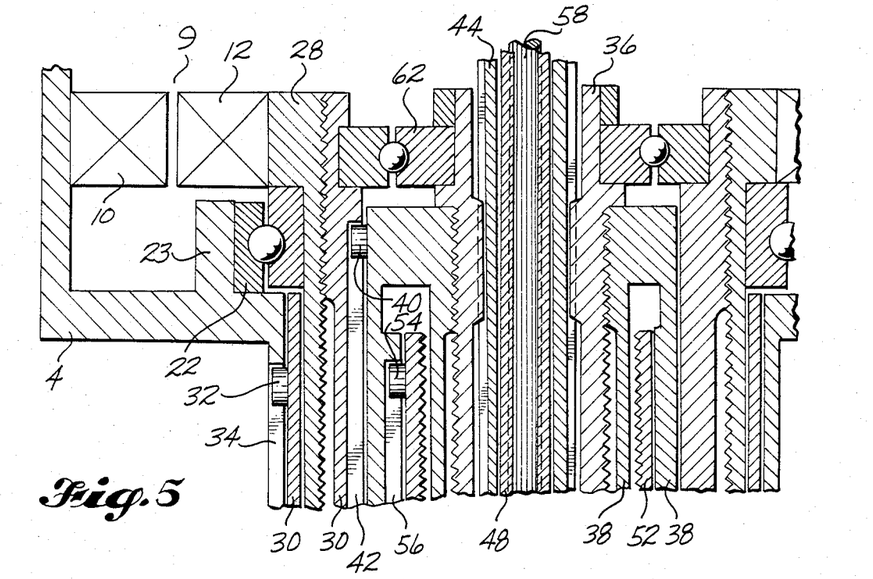
FIG. 5 is an enlarged fragmentary view of a portion of FIG. 1.
Figures 6, 9:
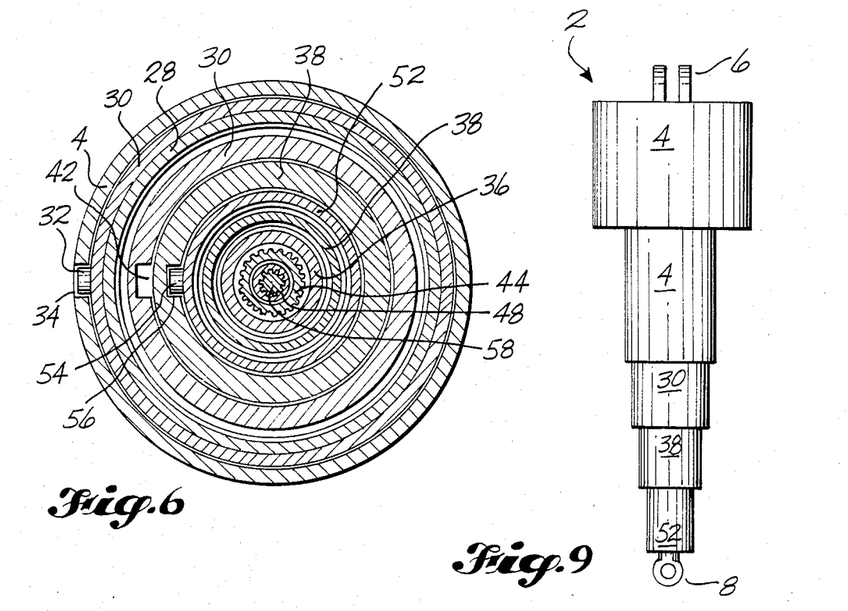
FIG. 6 is a cross-sectional view taken along the line 6—6 in FIG. 1.
FIG. 9 is like FIG. 7 except that it shows all three stages extended one-third of their full extension.

The drawings show a linear actuator 2 that is constructed according to the invention and that also constitutes the best mode of the apparatus of the invention currently known to the applicant. The actuator 2 shown in the drawings includes a housing 4 that is adapted to be attached to an adjacent structure at a fixed attach point 6. As shown in the drawings, the rod end 8 of the actuator 2 is free to move axially with respect to the adjacent structure. It is of course to be understood that the actuator could be mounted in other ways, such as by fixing the rod end 8 to an adjacent structure and leaving the other end of the actuator free so that the housing 4 moves axially during operation of the actuator.

The preferred embodiment of the actuator 2 shown in the drawings is a triple redundant actuator and includes three electric motors 9, 13, 17 that operate independently of each other. Each of the motors 9, 13, 17 has a stator 10, 14, 18, respectively, and a rotor 12, 16, 20, respectively. Each of the stators 10, 14, 18 is independently mounted on the housing 4. The rotors 12, 16, 20 are coaxial and are axially spaced from each other. Rotors 12, 16, 20 are mounted by bearings 22, 24, 26 for rotation with respect to the housing 4. Bearing 22 mounts the rotor 12 of the first motor 9 to a mounting flange 23 that is a part of the housing 4. Bearings 24, 26 mount the rotors 16, 20 of the second and third motors 13, 17, respectively, to a mounting flange 27 that is a part of the housing 4. Of course, the mounting arrangements for the rotors 12, 16, 20 can be varied considerably without departing from the spirit and scope of the invention. However, the arrangement shown in the drawings is preferred because of its compactness and simplicity.

The actuator 2 of the preferred embodiment includes three tubular extendible/retractable coaxial stages 30, 38, 52 that are positioned telescopically with respect to the housing 4 and with respect to each other. Each of these stages 30, 38, 52 is interconnected with a different one of the motor rotors 12, 16, 20 by a drive transmission means. The stages 30, 38, 52 and rotors 12, 16, 20 are all coaxial. This arrangement converts rotational motion of the rotor 12, 16, 20 into linear axial motion of its respective stage 30, 38, 52. Preferably, the interconnection of the rotors 12, 16, 20 and the stages 30, 38, 52 is provided by a screw-type engagement.

In the preferred embodiment, each drive transmission means includes a tubular axial extension 28, 36, 48 that is carried by the respective rotor 12, 16, 20 and that is coaxial with the three tubular coaxial stages 30, 38, 52. These tubular extensions 28, 36, 48 are threadedly interconnected with their corresponding stages 30, 38, 52. The threaded interconnection is provided by the engagement of a threaded cylindrical surface on the respective stage 30, 38, 52 by an adjacent threaded cylindrical surface on the respective axial extension 28, 36, 48. In each pair of interconnected surfaces, there is one concave cylindrical surface and one convex cylindrical surface and one of the surfaces is threaded essentially along its entire length with the other surface being threaded along only a portion of its length. In the actuator 2 shown in the drawings, the axial extensions 28, 36 (that interconnect with the first and second stages 30, 38) and the third stage 52 are each threaded along essentially their entire length.

All three of the stages, 30, 38, 52 are mechanically connected to the housing 4 and to each other to permit them to translate axially relative to the housing 4 and each other but prevent them from rotating relative to the housing 4 and each other. This mechanical connection is preferably accomplished by a key and slot arrangement as shown in the drawings. This arrangement includes three keys 32, 40, 54 and three corresponding keyways or slots 34, 42, 56. The first stage 30 has a bifurcated tubular configuration with two coaxial arms between which the tubular extension 28 of rotor 12 is positioned. The inner one of the arms is threaded to threadedly engage the extension 28, and the outer of the arms is radially adjacent to the housing 4 and carries a radial projection or key 32 that projects into an axially extending slot or keyway 34 in the housing 4. The second stage 38 is also bifurcated and has an inner arm that threadedly engages the outer convex surface of axial extension 36 and an outer arm that carries a key 40 that projects radially into an axially extending slot 42 in the inner arm of the first stage 30. Tubular third stage 52 is positioned radially between the two arms of the second stage 38. A key 54 projects radially from the third stage 52 into an axially extending slot 56 in the outer arm of the second stage 38. Each key 32, 40, 54 has essentially the same circumferential extent as its corresponding keyway 34, 42, 56.

In the preferred embodiment, the connections of the axial extensions 28, 36, 48 to their respective rotors 12, 16, 20 are arranged to permit some of the extensions and their interconnected stages to be moved axially by the axial movement of another stage. The outermost axial extension 28, which is connected to the first stage 30, is fixed to its rotor 12 and is preferably an integral part of the rotor 12. This prevents the extension 28 from either rotating or translating relative to the rotor 12. The other two axial extensions 36, 48 are mechanically connected to their respective rotors 16, 20 to permit them to translate axially relative to their respective rotors 16, 20 but prevent them from rotating relative to their respective rotors 16, 20.

The mechanical connections between the inner two axial extensions 36, 48 and their respective rotors 16, 20 are preferably spline connections. The middle extension 36 is spline connected to rotor 16 by means of a tubular spline shaft 44 that is coaxial with extension 36 and is positioned radially inwardly from extension 36. Spline shaft 44 has a plurality of axially extending, circumferentially spaced grooves into which are received a plurality of corresponding axially extending ridges projecting radially inwardly from the inner surface of extension 36. Spline shaft 44 is fixed to rotor 16 and is preferably an integral part of a generally U-shaped spline support 46 that is fixed to rotor 16 as shown in the drawings. The radially outer arm of support 46 is fixed to rotor 16, and the radially inner arm is engaged by bearing 24 which is in turn mounted on mounting flange 27. As can be seen in the drawings, the portion of mounting flange 27 to which bearing 24 is attached is positioned radially between the two axial arms of spline support 46. This arrangement provides a secure mounting for both rotor 16 and spline shaft 44.

The inner extension 48 is spline connected to its rotor 20 by means of a second spline shaft 58 that is coaxial with extension 48 and is positioned at the radial center of the actuator 2. Spline shaft 58 has a plurality of axially extending, circumferentially spaced grooves that receive a plurality of corresponding axially extending ridges that project radially inwardly from the inner surface of extension 48. Spline shaft 58 is fixed to rotor 20 by means of a spline support 60 with essentially the same configuration as spline support 46 except that spline support 60 has no center axial opening like the center axial opening in spline support 46 provided to accommodate the axial passage of extension 48 and spline shaft 58 past the second motor 13.

In addition to being spline connected to its respective rotor 16, 20, each of the inner two axial extensions 36, 48 is mounted by a bearing 62, 64, respectively, to the stage 30, 38 associated with the axial extension 28, 36 positioned radially adjacent to and outwardly of itself. Bearing 62 interconnects the first stage 30 and the middle axial extension 36 to permit rotation of extension 36 relative to stage 30 but prevent axial translation of stage 30 and extension 36 with respect to each other. Bearing 64 interconnects the second stage 38 and the innermost axial extension 48 to permit rotation of extension 48 relative to stage 38 but prevent axial translation of stage 38 and extension 48 with respect to each other. Bearing 62 is positioned between the ends of the radially inner arm of stage 30 and extension 36 opposite the rod end of the actuator 2. Bearing 64 is positioned between the rod end of the radially inner arm of stage 38 and a portion of extension 48 near its rod end. The end portion of axial extension 48 nearest the rod end of the actuator 2 forms a nut 50 that threadedly engages the third stage 52. The nut 50 is a threaded enlarged diameter portion of the extension 48. An intermediate diameter portion is positioned axially adjacent to the nut 50, and the bearing 64 is mounted on this intermediate diameter portion.

In the operation of the actuator 2, each of the motors 9, 13, 17 may be operated independently to extend or retract its respective stage 30, 38, 52. When the rotor 12 of the first motor 9 is rotated, the threaded connection between extension 28 and stage 30 and the keying of stage 30 to the housing 4 allow the rotation of extension 28 to cause axial translation of the first stage 30. Since the first stage 30 is joined to the second axial extension 36 by bearing 62, axial extension 36 translates along with the first stage 30. The threaded connection between extension 36 and the second stage 38 causes the second stage 38 to also be translated. In turn, axial extension 48 is translated by the axial movement of the second stage 38 via the bearing connection 64, and the third stage 52 is translated by the movement of its extension 48 via their threaded interconnection. In other words, when the first motor 9 is operated to extend or retract the first stage 30, the other two stages 38, 52 and their axial extensions 36, 48 are carried along with the first stage 30.

The axial extension 28 corresponding to the first stage 30 can never translate with respect to the housing 4 since it is an integral part of the rotor 12 that is mounted non-translationally onto the housing 4. The spline connection carried by the second and third motors 13, 17 allow the second and third stages 38, 52 and their respective axial extensions 36, 48 to move axially with respect to rotors 16, 20 and be carried along by the axial movement of the first stage 30.

When the second motor 13 is operated to extend or retract the second stage 38, the third stage 52 and its axial extension 48 are carried along with the second stage 38. The first stage 30 and the middle axial extension 36 are not extended during the operation of the second motor 13, and the bearing 62 allows rotation of the middle axial extension 36 while the first stage 30 remains stationary.

Operation of the third motor 17 extends or retracts only the third stage 52. The bearing 64 permits rotation of the inner axial extension 48 while the second stage 38 remains stationary.

In the preferred embodiment, the stages 30, 38, 52 and the axial extensions 28, 36, 48 are dimensioned so that the maximum axial displacement of each stage 30, 38, 52 resulting from rotation of its respective axial extension 28, 36, 48 is at least equal to the total axial displacement which the actuator 2 must provide. This makes it possible for any one of the three motors 9, 13, 17 to be operated to provide the total required displacement in the event of a failure in each of the other two motors or their screw drives.

In a situation in which the actuator 2 is used to move an aircraft control surface from one position to another, it is necessary for the actuator 2 not only to provide triple redundant full extension, but also to provide triple redundant return to at least a neutral position and sometimes also to a reverse position beyond the neutral position. In an aircraft with many control surfaces, it is sometimes sufficient to have triple redundant reliability for returning the control surface to a neutral position following full extension (or retraction) of the actuator 2 and failure in two of the drive means. In such a situation, the control surface would normally be returned to neutral and taken out of operation. The other control surfaces would then be sufficient to provide control of the aircraft.

It is anticipated that the normal operation of the actuator 2 in such large aircraft will involve extending each of the stages 30, 38, 52 one-third of its full extension to move the control surface to one of two opposite positions. The stages 30, 38, 52 and extensions 28, 36, 48 in this type of situation will be dimensioned so that one-third of the extension of each stage is equivalent to moving the control surface from one extreme position to a neutral position. Therefore, when there is a failure in two of the three drive means, the system may always be returned to neutral to neutralize the effect of the control surface by retracting the operational stage one-third of its maximum displacement.

In situations in which a control surface is crucial to maintaining sufficient control of the aircraft, such as in a small aircraft with a limited number of control surfaces, it is necessary for the control surface to remain fully operational following failure in two of the drive means. In this type of situation, the dimensioning of the actuator 2 would be modified so that one-third of the extension of each stage 30, 38, 52 would be equivalent to moving the control surface from one of its extreme positions to the opposite extreme position. Returning the control surface to a neutral position from either extreme position would require displacement of any one stage only one-sixth of its maximum displacement. Thus, if the three stages 30, 38, 52 are each extended one-third of their full extension in order to place the control surface in one of its operational positions, a failure in two of the three drive means will still leave the control surface fully operational since the remaining stage need only be retracted one-sixth to move the control surface into a neutral position or one-third to move the control surface into its opposite operational position. The control surface may be continued to be operated throughout the remainder of the flight by the one remaining stage to maintain control of the aircraft.

In either case, a single remaining operable stage may be retracted to bring the actuator 2 as a whole out of its fully extended position. Since the third stage 52 extends farthest out of the housing 4, retraction of stage 52 alone by operation of third motor 17 will retract the actuator 2. Operation of second motor 13 retracts both the second and third stages 38, 52 (via bearing 64), and operation of first motor 9 retracts all three stages 30, 38, 52 (via bearings 62, 64), to in each case retract the actuator 2 as a whole.

During the extending mode of the operation of the actuator 2, any malfunction in the extension of one or two of the stages may be fully compensated for by providing additional extension of the remaining operable stage or stages.

The operation of the actuator 2 is relatively simple but highly reliable. In situations in which safety requirements call for triple redundancy, the actuator and method of the invention provide the required redundancy in a minimum amount of space. Of course, should there be situations that require quadruple or greater redundancy, additional motors and stages could easily be added to the actuator to increase its degree of redundancy.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A linear actuator comprising:
a housing;
a plurality of extendible/retractable coaxial stages positioned telescopically with respect to the housing and each other;
a like number of electric motors, each of which has a stator portion attached to the housing, and a rotor portion;

drive transmission means interconnecting each rotor portion and a different one of the stages for converting rotational motion of the rotor portion into linear axial motion of the stage; and mechanical connection means for mechanically interconnecting the stages with each other to cause each stage, when it moves in a linear axial direction, to carry with it any other stages positioned with respect to it in a given radial direction so that the linear axial displacements of the stages are mechanically summed.

2. A linear actuator as described in claim 1, in which each drive transmission means comprises screw means.

3. A linear actuator as described in claim 2, in which each screw means comprises a threaded cylindrical surface on the interconnected stage, and an axial extension carried by the interconnected rotor portion and having a threaded cylindrical surface that threadedly engages said surface on said stage.

4. A linear actuator as described in claim 1, in which each drive transmission means includes an axial extension carried by the interconnected rotor portion, said extension being interconnected with the corresponding stage.

5. A linear actuator as described in claim 4, in which at least one, but not all, of the axial extensions is mechanically connected to its rotor portion to prevent it from rotating relative to its rotor portion but permit it to translate axially relative to its rotor portion.

6. A linear actuator as described in claim 4, in which one of the axial extensions is fixed to its rotor portion to prevent it from either rotating or translating relative to its rotor portion; each of the other axial extensions is mechanically connected to its rotor portion to prevent it from rotating relative to its rotor portion but permit it to translate axially relative to its rotor portion, and is positioned in said given radial direction with respect to the fixed axial extension; and all the stages are mechanically connected to the housing and each other to permit them to translate axially relative to the housing and each other but prevent them from rotating relative to the housing and each other.

7. A linear actuator as described in claim 6, in which each of said other axial extensions is spline connected to its rotor portion.

8. A linear actuator as described in claim 6, in which one of the pair including the housing and the stage interconnected with the fixed axial extension and one of each pair of radially adjacent stages has an axially extending slot, and the other of each of said pairs has a radial projection that projects into said slot in said one of its pair.

9. A linear actuator as described in claim 6, in which said mechanical connection means comprises bearing means interconnecting each of said other axial extensions and an adjacent stage that is radially adjacent to and positioned in a direction opposite to said given radial direction with respect to its interconnected stage, to permit rotation but prevent axial translation of said adjacent stage and said other axial extension with respect to each other.

10. A linear actuator as described in claim 8, in which said mechanical connection means comprises bearing means interconnecting each of said other axial extensions and an adjacent stage that is radially adjacent to and positioned in a direction opposite to said given radial direction with respect to its interconnected stage, to permit rotation but prevent axial translation of said adjacent stage and said other axial extension with respect to each other.

11. A linear actuator as described in claim 9, in which the stages and the axial extensions are dimensioned so that the maximum axial displacement of each stage resulting from rotation of its interconnected axial extension is at least equal to a desired total axial displacement.

12. A linear actuator as described in claim 11, in which each drive transmission means further includes screw means.

13. A linear actuator as described in claim 12, in which each screw means comprises a threaded cylindrical surface on the interconnected stage, and a threaded cylindrical surface on the axial extension that threadedly engages said cylindrical surface on said stage.

14. A method of providing redundant actuation of linear motion, comprising:

positioning a plurality of stages in a concentric telescopic arrangement;

operating independent drive means to axially displace each stage a given amount, and mechanically summing the displacements of the stages to produce a desired total axial displacement;

dimensioning each stage to make its maximum axial displacement by its drive means at least equal to said desired total axial displacement; and In the event of a failure of some but not all of the drive means, operating the remaining drive means to displace their stages additional amounts sufficient to provide said desired total axial displacement.

15. A method as described in claim 14, further comprising, after providing said desired total axial displacement, reversing any one of said drive means to displace its stage in the direction opposite to said total displacement to neutralize a system activated by said total displacement.

16. A linear actuator as described in claim 1, in which each drive transmission means interconnecting a stage positioned adjacent to and in said given radial direction with respect to another stage includes an axial extension that is axially translatable with respect to the rotor portion which it interconnects and that is axially nontranslatable with respect to the stage which it interconnects; and said mechanical connection means comprises bearing means interconnecting each said axial extension and said adjacent other stage, to permit rotation but prevent axial translation of said adjacent other stage and said axial extension with respect to each other.

* * * * *